(12) United States Patent
Shimada et al.

(10) Patent No.: US 8,518,843 B2
(45) Date of Patent: Aug. 27, 2013

(54) HEAT-ABSORBING GLASS PLATE AND ITS PRODUCTION PROCESS

(75) Inventors: Yuya Shimada, Tokyo (JP); Yuki Kondo, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/444,994

(22) Filed: Apr. 12, 2012

(65) Prior Publication Data

US 2012/0202677 A1     Aug. 9, 2012

Related U.S. Application Data

(63) Continuation of application No. PCT/JP2010/068744, filed on Oct. 22, 2010.

(30) Foreign Application Priority Data

Oct. 22, 2009   (JP) ................................ 2009-243284

(51) Int. Cl.
  *C03C 3/087*     (2006.01)
  *C03B 18/02*     (2006.01)
(52) U.S. Cl.
  USPC .............................................. 501/70; 65/90
(58) Field of Classification Search
  USPC .............................................. 501/70; 65/90
  See application file for complete search history.

(56) References Cited

U.S. PATENT DOCUMENTS

| 4,792,536 A | 12/1988 | Pecoraro et al. |
| 5,318,931 A | 6/1994 | Nakaguchi et al. |
| 6,673,730 B1 | 1/2004 | Shelestak |
| 7,951,734 B2 | 5/2011 | Nishizawa et al. |
| 2010/0129944 A1 | 5/2010 | Shimada et al. |
| 2011/0003483 A1 | 1/2011 | Nishizawa et al. |
| 2012/0015798 A1 | 1/2012 | Nishizawa et al. |

FOREIGN PATENT DOCUMENTS

| JP | 64-018938 | 1/1989 |
| JP | 05-058670 | 3/1993 |
| JP | 2002-348143 | 12/2002 |
| WO | WO 2007/125713 | 11/2007 |

OTHER PUBLICATIONS

International Search Report issued Jan. 25, 2011 in PCT/JP2010/068744 filed Oct. 22, 2010.

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

To provide a heat-absorbing glass plate which comprises soda lime silica glass containing coloring components, the coloring components containing, as represented by mass % based on the following oxides, from 0.45 to 0.61% of total iron as calculated as $Fe_2O_3$ and from 0.2 to 0.6% of $TiO_2$, which contains substantially no CoO, $Cr_2O_3$, $V_2O_5$, MnO nor $CeO_2$, which has a mass proportion of bivalent iron as calculated as $Fe_2O_3$ in total iron as calculated as $Fe_2O_3$ of from 45 to 60%, which has a solar transmittance of at most 42% calculated as 4 mm thickness, which has a visible light transmittance (by illuminant A) of at least 70% calculated as 4 mm thickness, and which provides a transmitted light having a dominant wavelength of from 492 to 500 nm.

8 Claims, No Drawings

HEAT-ABSORBING GLASS PLATE AND ITS PRODUCTION PROCESS

TECHNICAL FIELD

The present invention relates to a heat-absorbing glass plate and its production process.

BACKGROUND ART

As a heat-absorbing glass plate for an automobile, one comprising soda lime silica glass which is green or blue by containing coloring components has been known.

A heat-absorbing glass plate is required to have a low solar transmittance (for example, a solar transmittance (hereinafter sometimes referred to as Te) of at most 42% calculated as 4 mm thickness as identified in JIS R3106 (1998)) and a high visible light transmittance (for example, a visible light transmittance (hereinafter sometimes referred to as Tv) (by illuminant A) of at least 70% calculated as 4 mm thickness as defined in JIS R3106 (1998)).

Further, as a heat-absorbing glass plate, a green heat-absorbing glass plate which provides a more natural color tone of a transmitted light when a passenger looks out of window through the glass plate, tends to be preferred.

Further, for a heat-absorbing glass plate, with a view to suppressing inclusion of impurities when the glass base (kind of glass) is changed in a melting furnace to be used for production of glass and in view of the cost, it is required that the number of the coloring components is reduced as far as possible, and that the unit price of the material of the coloring component is low.

As a heat-absorbing glass plate, for example, the following (1) to (3) have been proposed.

(1) A heat-absorbing glass plate (Patent Document 1) comprising soda lime silica glass which contains, as coloring components, as represented by mass % based on oxides:
total iron as calculated as $Fe_2O_3$: 0.3 to 0.7%,
$CeO_2$: 1.7 to 2.5%,
$SO_3$: 0.01 to 0.1%,
$TiO_2$: 0 to 1% and
$MnO_2$: 0 to 1%,
which contains substantially no Se, NiO nor CoO, and which has a mass ratio of FeO/total $Fe_2O_3$ of from 0.26 to 0.60.

(2) A heat-absorbing glass plate (Patent Document 2) which comprises soda lime silica glass having a Redox of from 0.38 to 0.60,
containing from 0.005 to 0.18% of $SO_3$ as represented by mass % based on oxides, and
containing substantially no polysulfide, and
which contains, as coloring components, any one of I) to V) as represented by mass % or by mass ppm:
I) total iron as calculated as $Fe_2O_3$: 0.6 to 4%,
FeO: 0.23 to 2.4%,
CoO: 40 to 500 ppm,
Se: 5 to 70 ppm,
$Cr_2O_3$: 15 to 800 ppm,
$TiO_2$: 0.02 to 1%.
II) total iron as calculated as $Fe_2O_3$: 0.4 to 1%,
CoO: 4 to 40 ppm,
$Cr_2O_3$: 0 to 100 ppm.
III) total iron as calculated as $Fe_2O_3$: 0.9 to 2%,
FeO: 0.34 to 1.2%,
CoO: 90 to 250 ppm,
Se: 0 to 12 ppm,
$TiO_2$: 0 to 0.9%.
IV) total iron as calculated as $Fe_2O_3$: 0.7 to 2.2%,
FeO: 0.266 to 1.32%,
Se: 3 to 100 ppm,
CoO: 0 to 100 ppm.
V) total iron as calculated as $Fe_2O_3$: 0.9 to 2%,
FeO: 0.34 to 1.2%,
CoO: 40 to 150 ppm,
$Cr_2O_3$: 250 to 800 ppm,
$TiO_2$: 0.1 to 1%.

(3) A heat-absorbing glass plate (Patent Document 3) which comprises soda lime silica glass containing, as coloring component, as represented by mass % or mass ppm based on oxides:
total iron as calculated as $Fe_2O_3$: 0.45 to 0.65%,
bivalent iron as calculated as FeO: 0.23 to 0.28% and
CoO: 0 to 3 ppm, and
having a mass ratio of FeO/total $Fe_2O_3$ of from 0.35 to 0.55.

Although the heat-absorbing glass plate (1) is green, it does not satisfy both Te≦42% (calculated as 4 mm thickness) and Tv≧70% (calculated as 4 mm thickness). Further, it contains a large amount of $CeO_2$ in addition to $TiO_2$ as the coloring component, and accordingly there are problems of inclusion (as described hereinafter) of impurities when the glass base is changed and the cost.

Some of heat-absorbing glass plates (2) satisfy Te≦42% (calculated as 4 mm thickness) and Tv≧70% (calculated as 4 mm thickness), they are blue. Further, it contains a large number of coloring components, and accordingly there are problems of inclusion of impurities when the glass base is changed and the cost.

Some of heat-absorbing glass plates (3) satisfy Te≦42% (calculated as 4 mm thickness) and Tv≧70% (calculated as 4 mm thickness), they are blue. Further, when such a heat-absorbing glass plate contains CoO, there is a problem of inclusion of impurities when the glass base is changed, since CoO makes the glass blue even with a small amount.

As described above, it has been difficult to obtain a heat-absorbing glass plate which satisfies Te≦42% (calculated as 4 mm thickness) and Tv≧70% (calculated as 4 mm thickness), the transmitted light through which is green, and which contains a small number of coloring components.

PRIOR ART DOCUMENTS

Patent Documents
Patent Document 1: JP-A-2002-348143
Patent Document 2: U.S. Pat. No. 6,673,730
Patent Document 3: WO2007/125713

DISCLOSURE OF INVENTION

Technical Problem

The present invention provides a heat-absorbing glass plate which satisfies both low solar transmittance (Te) and high visible light transmittance (Tv), the transmitted light through which is green, and which contains a small number of coloring components. More specifically, the present invention provides a heat-absorbing glass plate which satisfies Te≦42% (calculated as 4 mm thickness) and Tv≧70% (calculated as 4 mm thickness), the transmitted light through which is green with a dominant wavelength of from 492 to 500 nm, and which contains a small number of coloring components.

Solution to Problem

The heat-absorbing glass plate of the present invention comprises soda lime silica glass containing coloring components, the coloring components containing, as represented by mass % based on the following oxides, from 0.45 to 0.61% of total iron as calculated as $Fe_2O_3$ and from 0.2 to 0.6% of $TiO_2$, which contains substantially no CoO, $Cr_2O_3$, $V_2O_5$, MnO nor $CeO_2$, which has a mass proportion of bivalent iron as calculated as $Fe_2O_3$ in total iron as calculated as $Fe_2O_3$ of from 45 to 60%, which has a solar transmittance of at most 42% calculated as 4 mm thickness as defined in JIS R3106 (1998), which has a visible light transmittance (by illuminant A) of at least 70% calculated as 4 mm thickness as defined in JIS R3106 (1998), and which provides a transmitted light having a dominant wavelength of from 492 to 500 nm as defined in JIS Z8701 (1982).

Further, the heat-absorbing glass plate of the present invention comprises soda lime silica glass containing coloring components, the coloring components containing, as represented by mass % based on the following oxides, from 0.45 to 0.61% of total iron as calculated as $Fe_2O_3$ and from 0.2 to 0.6% of $TiO_2$, which contains substantially no cobalt oxide, chromium oxide, vanadium oxide, manganese oxide nor cerium oxide, which has a mass proportion of bivalent iron as calculated as $Fe_2O_3$ in total iron as calculated as $Fe_2O_3$ of from 45 to 60%, which has a solar transmittance of at most 42% calculated as 4 mm thickness as defined in JIS R3106 (1998), which has a visible light transmittance (by illuminant A) of at least 70% calculated as 4 mm thickness as defined in JIS R3106 (1998), and which provides a transmitted light having a dominant wavelength of from 492 to 500 nm as defined in JIS Z8701 (1982).

The heat-absorbing glass plate of the present invention preferably comprises soda lime silica glass having a composition substantially comprising, as represented by mass % based on the following oxides:

$SiO_2$: 65 to 75%,
$Al_2O_3$: 0.1 to 5%,
$Na_2O+K_2O$: 10 to 18%,
CaO: 5 to 15%,
MgO: 2 to 6%,
$SnO_2$: 0 to 0.5%,
$SO_3$: 0 to 1%,
total iron as calculated as $Fe_2O_3$: 0.45 to 0.61%,
$TiO_2$: 0.2 to 0.6%.

The process for producing a heat-absorbing glass plate of the present invention comprises melting a glass raw material and forming the melt into a plate to produce soda lime silica glass containing coloring components, wherein the coloring components of the glass after forming contain, as represented by mass % based on the following oxides, from 0.45 to 0.61% of total iron as calculated as $Fe_2O_3$ and from 0.2 to 0.6% of $TiO_2$, the heat-absorbing glass plate contains substantially no CoO, $Cr_2O_3$, $V_2O_5$, MnO nor $CeO_2$, and has a mass proportion of bivalent iron as calculated as $Fe_2O_3$ in total iron as calculated as $Fe_2O_3$ of from 45 to 60%, and the glass plate after forming has a solar transmittance of at most 42% calculated as 4 mm thickness as defined in JIS R3106 (1998), has a visible light transmittance (by illuminant A) of at least 70% calculated as 4 mm thickness as defined in JIS R3106 (1998), and provides a transmitted light having a dominant wavelength of from 492 to 500 nm as defined in JIS Z8701 (1982).

Further, the process for producing a heat-absorbing glass plate of the present invention comprises melting a glass raw material and forming the melt into a plate to produce soda lime silica glass containing coloring components, wherein the coloring components of the glass after forming contain, as represented by mass % based on the following oxides, from 0.45 to 0.61% of total iron as calculated as $Fe_2O_3$ and from 0.2 to 0.6% of $TiO_2$, the heat-absorbing glass plate contains substantially no cobalt oxide, chromium oxide, vanadium oxide, manganese oxide nor cerium oxide, and has a mass proportion of bivalent iron as calculated as $Fe_2O_3$ in total iron as calculated as $Fe_2O_3$ of from 45 to 60%, and the glass plate after forming has a solar transmittance of at most 42% calculated as 4 mm thickness as defined in JIS R3106 (1998), has a visible light transmittance (by illuminant A) of at least 70% calculated as 4 mm thickness as defined in JIS R3106 (1998), and provides a transmitted light having a dominant wavelength of from 492 to 500 nm as defined in JIS Z8701 (1982).

In this specification, "to" is meant to include values before and after it as the lower limit and the upper limit, unless otherwise specified.

Advantageous Effects of Invention

The heat-absorbing glass plate of the present invention satisfies both low solar transmittance and high visible light transmittance, the transmitted light through which is green, and which contains a small number of coloring components.

DESCRIPTION OF EMBODIMENTS

The heat-absorbing glass plate of the present invention is characterized by satisfying Te≦42% (calculated as 4 mm thickness) and Tv≧70% (calculated as 4 mm thickness) and achieving a green transmitted light, by totally adjusting three of the content of total iron as calculated as $Fe_2O_3$, the content of $TiO_2$ and the mass proportion of bivalent iron as calculated as $Fe_2O_3$ in total iron as calculated as $Fe_2O_3$.

The content of total iron as calculated as $Fe_2O_3$ is from 0.45 to 0.61% as represented by mass % based on oxides. When the content of total iron as calculated as $Fe_2O_3$ is at least 0.45%, Te can be suppressed low. Along with an increase in the content of total iron as calculated as $Fe_2O_3$, Te is lowered, but Tv is also lowered. When the content of total iron as calculated as $Fe_2O_3$ is at most 0.61%, a decrease of Tv can be prevented, and Tv can be made at least 70% (calculated as 4 mm thickness). The content of total iron as calculated as $Fe_2O_3$ is, as represented by mass % based on oxides, preferably from 0.47 to 0.55%, more preferably from 0.49 to 0.54%.

In this specification, the content of total iron is represented as an amount of $Fe_2O_3$ in accordance with a standard method of analysis, however, not the entire iron present in glass is present as trivalent iron.

Usually, bivalent iron is present in glass. The bivalent iron has an absorption peak in the vicinity of a wavelength of 1,100 nm, and trivalent iron has an absorption peak in the vicinity of a wavelength of 400 nm. Accordingly, when attention is focused on the infrared absorptivity, the amount of bivalent iron is preferably larger than trivalent iron. Accordingly, with a view to suppressing Te low, the mass proportion of bivalent iron (hereinafter referred to as Redox) as calculated as $Fe_2O_3$ in total iron as calculated as $Fe_2O_3$ is preferably increased.

Redox in the heat-absorbing glass plate of the present invention is from 45 to 60%. When Redox is at least 45%, Te can be suppressed low. When Redox is at most 60%, the step of melting the glass raw material will not be complicated, and a desired green heat-absorbing glass plate can be obtained along with the addition amounts of $Fe_2O_3$ (as described above) and $TiO_2$ (as described hereinafter). Redox is preferably from 48 to 57%, more preferably from 50 to 55%.

The $TiO_2$ content is from 0.2 to 0.6% as represented by mass % based on oxides. When the $TiO_2$ content is at least 0.2%, a desired green heat-absorbing glass plate can be obtained by adjusting the addition amount of $Fe_2O_3$ (as described above) and the above-described Redox. When the $TiO_2$ content is at most 0.6%, Tv can be made high. The $TiO_2$ content is, as represented by mass % based on oxides, preferably from 0.3 to 0.5%, more preferably from 0.32 to 0.41%.

The heat-absorbing glass plate of the present invention contains substantially no $CoO$, $Cr_2O_3$, $V_2O_5$, $MnO$ nor $CeO_2$. Containing substantially no $CoO$, $Cr_2O_3$, $V_2O_5$, $MnO$ nor $CeO_2$ means that $CoO$, $Cr_2O_3$, $V_2O_5$, $MnO$ and $CeO_2$ are not contained at all, or $CoO$, $Cr_2O_3$, $V_2O_5$, $MnO$ and $CeO_2$ may be contained as impurities which are included inevitably in the production. When substantially no $CoO$, $Cr_2O_3$, $V_2O_5$, $MnO$ nor $CeO_2$ is contained, inclusion of impurities when the glass base is changed can be suppressed, and the cost of the heat-absorbing glass plate can be suppressed.

In the glass compositional analysis, usually the composition is determined as calculated as predetermined oxides of the respective components. That is, in the compositional analysis of the cobalt (Co) component, the cobalt component is calculated as an oxide of CoO, and its proportion in the composition is determined, and even when various cobalt oxides depending on the valencies of Co are present, the analysis value is calculated as CoO. Accordingly, containing substantially no CoO means that substantially no cobalt oxide is contained. The chromium (Cr) component, the vanadium (V) component, the manganese component and the cerium component are also the same as the above cobalt component and containing substantially $Cr_2O_3$ means that substantially no chromium oxide is contained, containing substantially no $V_2O_5$ means that substantially no vanadium oxide is contained, containing substantially no MnO means that substantially no manganese oxide is contained, and containing substantially no $CeO_2$ means that substantially no cerium oxide is contained.

Further, inclusion of impurities when the glass base is changed means as follows.

Commercial production of various glass plates for building, for automobiles and the like, is carried out usually not by a batch method but by a continuous production process of putting a glass raw material in a large-sized glass melting furnace, melting the glass raw material in the glass melting furnace, refining the molten glass while it is moved forward, and forming the molten glass into a plate in a float bath which is a forming bath. Accordingly, change of the composition of glass, i.e. the change of the glass base is started from a change of the glass raw material to be charged, while glass before the change is produced. Accordingly, when the kind of glass is changed, it will take long to change the glass composition to the desired composition. One of reasons why the change of the composition takes long is that when the kind of glass is changed, components of glass before the change are included in glass after the change. Particularly when coloring components are contained in the glass composition before the change of the composition, such coloring components greatly influence the color tone and the optical performance of the glass to be changed even with very small amounts, and such components are impurities in glass after the change. Inclusion of impurities when the glass base is changed means, as described above, that when the kind of glass is changed to another one, components of glass before the change are included in glass after the change. Particularly if impurities such as $CoO$, $Cr_2O_3$, $V_2O_5$, $MnO$ and $CeO_2$ as coloring components are included, the color tone of glass after the change is greatly influenced.

The heat-absorbing glass plate of the present invention preferably comprises soda lime silica glass having a composition substantially comprising, as represented by mass % based on the following oxides:

$SiO_2$: 65 to 75%,
$Al_2O_3$: 0.1 to 5%,
$Na_2O+K_2O$: 10 to 18%,
CaO: 5 to 15%,
MgO: 2 to 6%,
$SnO_2$: 0 to 0.5%,
$SO_3$: 0 to 1%,
total iron as calculated as $Fe_2O_3$: 0.45 to 0.61%, and
$TiO_2$: 0.2 to 0.6%.

When the $SiO_2$ content is at least 65%, good weather resistance will be obtained. When the $SiO_2$ content is at most 75%, devitrification hardly occurs. The $SiO_2$ content is preferably from 67 to 74%, more preferably from 69 to 73% as represented by mass % based on oxides.

$Al_2O_3$ is a component to improve the weather resistance.

When the $Al_2O_3$ content is at least 0.1%, good weather resistance will be obtained. When the $Al_2O_3$ content is at most 5%, good melting property will be obtained. The $Al_2O_3$ content is preferably from 0.5 to 4%, more preferably from 1 to 3%, further preferably from 1.5 to 2.5%, as represented by mass % based on oxides.

$Na_2O$ and $K_2O$ are components to accelerate melting of the glass raw material.

When the content of $Na_2O+K_2O$ is at least 10%, good melting property will be obtained. When the content of $Na_2O+K_2O$ is at most 18%, good weather resistance will be obtained. The content of $Na_2O+K_2O$ is preferably from 11 to 16%, more preferably from 12 to 14%, as represented by mass % based on oxides.

The $Na_2O$ content is preferably from 5 to 18%, more preferably from 10 to 16%, further preferably from 12 to 14%. Further, the $K_2O$ content is preferably from 0 to 5%, more preferably from 0 to 2%, further preferably from 0 to 1%.

CaO is a component to accelerate melting of the glass raw material and to improve the weather resistance.

When the CaO content is at least 5%, good melting property and weather resistance will be obtained. When the CaO content is at most 15%, devitrification hardly occurs. The CaO content is preferably from 6 to 12%, more preferably from 7 to 10% as represented by mass % based on oxides.

MgO is a component to accelerate melting of the glass raw material and to improve the weather resistance.

When the MgO content is at least 2%, good melting property and weather resistance will be obtained. When the MgO content is at most 6%, devitrification hardly occurs. The MgO content is preferably from 2 to 5%, more preferably from 3 to 4% as represented by mass % based on oxides.

$SnO_2$ may be used as a reducing agent or a refining agent. When the $SnO_2$ content is at most 0.5%, volatilization of $SnO_2$ tends to be small, and the cost can be suppressed low.

The $SnO_2$ content is preferably from 0 to 0.3%, more preferably from 0 to 0.1% as represented by mass % based on oxides.

$SO_3$ may be used as a refining agent. When the $SO_3$ content is at most 1%, the gas component of $SO_2$ will not remain in glass as bubbles The $SO_3$ content is preferably from 0.02 to 0.5%, more preferably from 0.05 to 0.2% as represented by mass % base on oxides.

The specific gravity of the heat-absorbing glass plate of the present invention is preferably from 2.49 to 2.55, more preferably from 2.50 to 2.53. When the specific gravity of the heat-absorbing glass plate of the present invention is equal to that of conventional soda lime silica glass, the efficiency when the composition is changed (the glass base is changed) at the time of production can be improved.

The specific gravity of the heat-absorbing glass plate of the present invention can be adjusted by adjusting the glass composition. Specifically, the mass ratio of $SiO_2/(MgO+CaO)$ is preferably from 5.0 to 7.0, more preferably from 5.4 to 6.6. Further, the mass ratio of CaO/MgO is preferably from 1.3 to 2.5, more preferably from 1.5 to 2.3.

Te (calculated as 4 mm thickness) of the heat-absorbing glass plate of the present invention is at most 42%, preferably at most 40%. Te is the solar transmittance calculated by measuring the transmittance by a spectrophotometer in accordance with JIS R3106 (1998) (hereinafter referred to simply as JIS R3106).

Tv (calculated as 4 mm thickness) of the heat-absorbing glass plate of the present invention is at least 70%, preferably at least 71.5%. Tv is the visible light transmittance calculated by measuring the transmittance by a spectrophotometer in accordance with JIS R3106. The coefficient is a value of the 2 degree field of view with illuminant A.

The dominant wavelength of the transmitted light through the heat-absorbing glass plate of the present invention is from 492 to 500 nm, preferably from 492 to 495 nm. When the dominant wavelength is within such a range, a desired green heat-absorbing glass plate will be obtained. The dominant wavelength is calculated by measuring the transmittance by a spectrophotometer in accordance with JIS Z8701 (1982). The coefficient is a value of the 2 degree field of view with illuminant C.

The heat-absorbing glass plate of the present invention can be used either for vehicles and for building, and is particularly suitable as a windshield of an automobile. When it is used as window glass for an automobile, as the case requires, it is formed into laminated glass having an interlayer sandwiched between a plurality of glass plates, glass having flat glass processed to have a curved surface, or chemically tempered glass. Further, when it is used as double glazing for building, it is used as double glazing comprising two sheets of the heat-absorbing glass plates of the present invention or as double glazing of the heat-absorbing glass plate of the present invention and another glass plate.

The heat-absorbing glass plate of the present invention is produced, for example, by means of the following steps (i) to (v) in order.

(i) A glass matrix material such as silica sand, coloring component materials such as an iron source and a titanium source, a reducing agent, a refining agent and the like are mixed to achieve the desired composition to prepare a glass raw material.

(ii) The glass raw material is continuously supplied to a melting furnace, heated by burning heavy oil or the like, and heated to a temperature of about 1,500° C. for example and melted to form molten glass.

(iii) The molten glass is refined, and then formed into a glass plate having a predetermined thickness e.g. by float process.

(iv) The glass plate is annealed and cut into a predetermined size to obtain a heat-absorbing glass plate of the present invention.

(v) As the case requires, the cut glass plate may be chemically tempered, may be formed into laminated glass, or may be formed into double glazing.

The glass matrix material may be one used as a material of conventional soda lime silica glass, such as silica sand.

Further, the iron source as a coloring component may, for example, be iron powder, purple oxide or iron oxide red, and the titanium source may, for example, be titanium oxide.

The reducing agent may, for example, be carbon or coke. The reducing agent is to suppress oxidation of iron in the molten glass to achieve desired Redox.

In addition, $SnO_2$ may be used as a reducing agent or as a refining agent, and $SO_3$ may be used as a refining agent.

Since the above-described heat-absorbing glass plate of the present invention comprises soda lime silica glass containing, as coloring components, as represented by mass % based on oxides, from 0.45 to 0.61% of total iron as calculated as $Fe_2O_3$ and from 0.2 to 0.6% of $TiO_2$, containing substantially no CoO, $Cr_2O_3$, $V_2O_5$, MnO nor $CeO_2$ and having Redox of from 45 to 60%, it satisfies Te≦42% (calculated as 4 mm thickness) and Tv≧70% (calculated as 4 mm thickness), provides a green transmitted light, and contains a small number of coloring components.

Of the heat-absorbing glass plate of the present invention, β-OH is preferably from 0.20 to 0.35 $mm^{-1}$, more preferably from 0.23 to 0.30 $mm^{-1}$, further preferably from 0.25 to 0.28 $mm^{-1}$. By making β-OH of the heat-absorbing glass plate of the present invention be higher than β-OH of conventional soda lime silica glass, the clarity can be improved, and the temperature in the bending step can be decreased.

Tuv (calculated as 4 mm thickness) of the heat-absorbing glass plate of the present invention is preferably lower particularly when used as glass for vehicles, and it is specifically preferably at most 32%, more preferably at most 30%. Tuv is the ultraviolet transmittance calculated by measurement by a spectrophotometer in accordance with JISO 9050.

EXAMPLES

Now, the present invention will be described in detail with reference to Examples. However, it should be understood that the present invention is by no means restricted to such specific Examples.

Examples 1 to 18 and 22 to 39 are Examples of the present invention, and Examples 19 to 21 are Comparative Examples.
(Calculation of Redox)

With respect to the obtained glass plate, Redox was calculated in accordance with the following formula from a spectral curve of glass measured by a spectrophotometer:

$$\text{Redox}(\%) = -\log e(T_{1000nm}/91.4)/(Fe_2O_3 \text{ amount} \times t \times 20.79) \times 100$$

In the above formula, $T_{1000nm}$ is the transmittance (%) at a wavelength of 1,000 nm, t is the thickness (cm) of the glass plate, and the $Fe_2O_3$ amount is the content (%=mass percentage) of total iron as calculated as $Fe_2O_3$.

The above Redox is determined from a spectral curve of glass measured by a spectrophotometer, and this value can be considered to be equal to the mass proportion of bivalent iron as calculated as $Fe_2O_3$ in total iron as calculated as $Fe_2O_3$ in the same glass.

(Measurement of Te)

With respect to the obtained glass plate, the solar transmittance (Te) as defined in JIS R3106 was obtained as a value calculated as 4 mm thickness.

(Measurement of Tv)

With respect to the obtained glass plate, the visible light transmittance (Tv) (by illuminant A) as defined in JIS R3106 was obtained as a value calculated as 4 mm thickness.

(Measurement of Tuv)

With respect to the obtained glass plate, the ultraviolet transmittance (Tuv) as defined in ISO 9050 was obtained as a value calculated as 4 mm thickness.

(Measurement of Dw)

With respect to the obtained glass plate, the dominant wavelength (Dw) of the transmitted light as defined in JIS Z8701 (1982) was obtained.

(Measurement of β-OH)

With respect to the obtained glass plate, β-OH was calculated in accordance with the following formula from a spectral curve of glass measured by FT-IR.

$$\beta\text{-OH}(\text{mm}^{-1}) = -\log_{10}(T3500\ \text{cm}^{-1}/T4000\ \text{cm}^{-1})/t$$

In the above formula, $T3500\ \text{cm}^{-1}$ is the transmittance (%) at a wave number of $3{,}500\ \text{cm}^{-1}$, $T4000\ \text{cm}^{-1}$ is the transmittance (%) at a wave number of $4{,}000\ \text{cm}^{-1}$, and t is the thickness (mm) of the glass plate.

Examples 1 to 39

The respective materials were mixed to achieve compositions as identified in Tables 1 to 7 to prepare glass raw materials. Each glass raw material was put into a crucible and heated in an electric furnace at 1,500° C. to form molten glass. The molten glass was cast on a carbon plate and cooled. Both surfaces were polished to obtain a glass plate having a thickness of 4 mm. With respect to the glass plate, the transmittance was measured every 1 nm by using a spectrophotometer (manufactured by PerkinElmer Co., Ltd., Lambda 950) to determine Te, Tv, Tuv and Dw. Further, the glass was polished into a thickness of 2 mm, and with respect to this glass plate, the transmittance was measured every $1\ \text{cm}^{-1}$ by FT-IR (Thermo Nicolet Avatar 370) to determine β-OH.

The results are shown in Tables 1 to 7.

TABLE 1

| | | Ex. 1 | Ex. 2 | Ex. 3 | Ex. 4 | Ex. 5 | Ex. 6 |
|---|---|---|---|---|---|---|---|
| Composition (%: mass percentage) | $SiO_2$ | 71.9 | 71.9 | 72.1 | 72.0 | 72.0 | 72.0 |
| | $Al_2O_3$ | 1.9 | 1.9 | 1.9 | 1.9 | 1.9 | 1.9 |
| | MgO | 3.8 | 3.8 | 3.8 | 3.8 | 3.8 | 3.8 |
| | CaO | 8.1 | 8.1 | 8.1 | 8.0 | 8.1 | 8.1 |
| | $Na_2O$ | 13.0 | 13.0 | 13.0 | 13.0 | 13.0 | 13.0 |
| | $K_2O$ | 0.3 | 0.3 | 0.3 | 0.3 | 0.3 | 0.3 |
| | $Fe_2O_3$ | 0.54 | 0.51 | 0.54 | 0.54 | 0.54 | 0.54 |
| | Redox | 49 | 56 | 50 | 51 | 48 | 46 |
| | $TiO_2$ | 0.41 | 0.41 | 0.31 | 0.41 | 0.36 | 0.36 |
| Tv (calculated as 4 mm thickness) [%] | | 72 | 71.5 | 72.2 | 70.9 | 72.7 | 73.4 |
| Te (calculated as 4 mm thickness) [%] | | 39.8 | 38.8 | 40 | 39.0 | 40.9 | 41.8 |
| Tuv (calculated as 4 mm thickness) [%] | | 30.9 | 32.4 | 32.9 | 30.2 | 31.2 | 30.8 |
| Dw [nm] | | 494 | 493 | 492 | 494 | 493 | 493 |
| $T_{1000\ nm}$ [%] | | 10.2 | 8.9 | 9.9 | 9.8 | 11.2 | 12.2 |
| β-OH ($10^{-2} \cdot \text{mm}^{-1}$) | | 25.5 | 27.2 | 26.1 | 29.1 | 23.6 | 31.2 |

TABLE 2

| | | Ex. 7 | Ex. 8 | Ex. 9 | Ex. 10 | Ex. 11 | Ex. 12 |
|---|---|---|---|---|---|---|---|
| Composition (%: mass percentage) | $SiO_2$ | 72.0 | 72.0 | 72.0 | 71.9 | 71.8 | 72.1 |
| | $Al_2O_3$ | 1.9 | 1.9 | 1.9 | 1.9 | 1.9 | 1.9 |
| | MgO | 3.8 | 3.8 | 3.8 | 3.8 | 3.8 | 3.8 |
| | CaO | 8.1 | 8.1 | 8.1 | 8.0 | 8.0 | 8.1 |
| | $Na_2O$ | 13.0 | 13.0 | 13.0 | 13.0 | 13.0 | 13.1 |
| | $K_2O$ | 0.3 | 0.3 | 0.3 | 0.3 | 0.3 | 0.3 |
| | $Fe_2O_3$ | 0.51 | 0.48 | 0.51 | 0.51 | 0.51 | 0.51 |
| | Redox | 58 | 55 | 48 | 53 | 57 | 52 |
| | $TiO_2$ | 0.41 | 0.41 | 0.41 | 0.41 | 0.41 | 0.31 |
| | $SnO_2$ | | | | 0.1 | 0.3 | |
| Tv (calculated as 4 mm thickness) [%] | | 71.4 | 72.7 | 73.4 | 72.3 | 71.2 | 73.0 |
| Te (calculated as 4 mm thickness) [%] | | 38.2 | 40.6 | 42.0 | 39.9 | 38.3 | 40.9 |
| Tuv (calculated as 4 mm thickness) [%] | | 33.2 | 33.8 | 31.5 | 32.5 | 32.6 | 34.1 |
| Dw [nm] | | 492 | 493 | 494 | 493 | 492 | 492 |
| $T_{1000\ nm}$ [%] | | 8.3 | 10.8 | 12.4 | 10.0 | 8.4 | 10.7 |
| β-OH ($10^{-2} \cdot \text{mm}^{-1}$) | | 23.7 | 24.3 | 27.5 | 23.7 | 24.7 | 23.6 |

TABLE 3

|  |  | Ex. 13 | Ex. 14 | Ex. 15 | Ex. 16 | Ex. 17 | Ex. 18 |
|---|---|---|---|---|---|---|---|
| Composition (%: mass percentage) | $SiO_2$ | 72.1 | 72.0 | 72.0 | 72.0 | 72.1 | 72.1 |
|  | $Al_2O_3$ | 1.9 | 1.9 | 1.9 | 1.9 | 1.9 | 1.9 |
|  | MgO | 3.8 | 3.8 | 3.8 | 3.8 | 3.8 | 3.8 |
|  | CaO | 8.1 | 8.1 | 8.1 | 8.1 | 8.1 | 8.1 |
|  | $Na_2O$ | 13.0 | 13.0 | 13.0 | 13.0 | 13.0 | 13.0 |
|  | $K_2O$ | 0.3 | 0.3 | 0.3 | 0.3 | 0.3 | 0.3 |
|  | $Fe_2O_3$ | 0.54 | 0.59 | 0.59 | 0.61 | 0.53 | 0.53 |
|  | Redox | 49 | 47 | 47 | 46 | 46 | 46 |
|  | $TiO_2$ | 0.31 | 0.31 | 0.31 | 0.31 | 0.35 | 0.35 |
| Tv (calculated as 4 mm thickness) [%] |  | 72.6 | 71.2 | 71.1 | 70.6 | 73.0 | 72.9 |
| Te (calculated as 4 mm thickness) [%] |  | 40.7 | 38.9 | 39.0 | 38.6 | 41.2 | 41.1 |
| Tuv (calculated as 4 mm thickness) [%] |  | 32.0 | 29.7 | 29.1 | 28.3 | 32.1 | 32.5 |
| Dw [nm] |  | 492 | 492 | 493 | 493 | 493 | 493 |
| $T_{1000\,nm}$ [%] |  | 10.8 | 9.4 | 9.6 | 9.3 | 11.3 | 11.2 |
| β-OH ($10^{-2} \cdot mm^{-1}$) |  | 29.3 | 22.8 | 27.6 | 26.3 | 27.2 | 25.4 |

TABLE 4

|  |  | Ex. 19 | Ex. 20 | Ex. 21 |
|---|---|---|---|---|
| Composition (%: mass percentage) | $SiO_2$ | 72.2 | 71.9 | 72.0 |
|  | $Al_2O_3$ | 1.9 | 1.9 | 1.9 |
|  | MgO | 3.8 | 3.8 | 3.8 |
|  | CaO | 8.1 | 8.1 | 8.1 |
|  | $Na_2O$ | 13.1 | 13.0 | 13.1 |
|  | $K_2O$ | 0.3 | 0.3 | 0.3 |
|  | $Fe_2O_3$ | 0.56 | 0.54 | 0.41 |
|  | Redox | 52 | 38 | 54 |
|  | $TiO_2$ |  | 0.41 | 0.41 |

TABLE 4-continued

|  | Ex. 19 | Ex. 20 | Ex. 21 |
|---|---|---|---|
| Tv (calculated as 4 mm thickness) [%] | 72 | 75.5 | 75.6 |
| Te (calculated as 4 mm thickness) [%] | 39.4 | 45.9 | 44.9 |
| Tuv (calculated as 4 mm thickness) [%] | 38.6 | 29.0 | 38.0 |
| Dw [nm] | 488 | 495 | 493 |
| $T_{1000\,nm}$ [%] | 8.3 | 17.4 | 15.2 |
| β-OH ($10^{-2} \cdot mm^{-1}$) | 22.1 | 27.5 | 34.3 |

TABLE 5

|  |  | Ex. 22 | Ex. 23 | Ex. 24 | Ex. 25 | Ex. 26 | Ex. 27 |
|---|---|---|---|---|---|---|---|
| Composition (%: mass percentage) | $SiO_2$ | 72.1 | 72.1 | 72.1 | 72.0 | 72.1 | 72.1 |
|  | $Al_2O_3$ | 1.9 | 1.9 | 2.1 | 1.8 | 2.4 | 2.4 |
|  | MgO | 3.8 | 3.8 | 3.2 | 3.9 | 2.6 | 2.7 |
|  | CaO | 8.0 | 8.0 | 8.5 | 8.0 | 8.8 | 8.8 |
|  | $Na_2O$ | 13.0 | 13.0 | 13.1 | 13.0 | 13.1 | 13.1 |
|  | $K_2O$ | 0.3 | 0.3 | 0.2 | 0.4 | 0.1 | 0.1 |
|  | $Fe_2O_3$ | 0.52 | 0.52 | 0.52 | 0.52 | 0.52 | 0.52 |
|  | Redox | 49 | 49 | 53 | 50 | 53 | 51 |
|  | $TiO_2$ | 0.34 | 0.34 | 0.35 | 0.34 | 0.38 | 0.35 |
| Tv (calculated as 4 mm thickness) [%] |  | 72.6 | 70.1 | 71.8 | 70.4 | 72.3 | 71.1 |
| Te (calculated as 4 mm thickness) [%] |  | 40.7 | 39.4 | 40.3 | 38.6 | 40.3 | 38.8 |
| Tuv (calculated as 4 mm thickness) [%] |  | 32.0 | 30.1 | 31.5 | 30.1 | 32.4 | 29.9 |
| Dw [nm] |  | 492 | 498 | 493 | 494 | 493 | 499 |
| $T_{1000\,nm}$ [%] |  | 10.8 | 11.0 | 11.0 | 9.4 | 10.7 | 9.8 |
| β-OH ($10^{-2} \cdot mm^{-1}$) |  | 26.6 | 22.9 | 25.0 | 23.3 | 25.9 | 23.4 |

TABLE 6

|  |  | Ex. 28 | Ex. 29 | Ex. 30 | Ex. 31 | Ex. 32 | Ex. 33 |
|---|---|---|---|---|---|---|---|
| Composition (%: mass percentage) | $SiO_2$ | 72.1 | 72.1 | 72.0 | 72.0 | 72.0 | 72.0 |
|  | $Al_2O_3$ | 2.3 | 2.6 | 2.7 | 2.6 | 2.7 | 2.9 |
|  | MgO | 2.7 | 2.3 | 2.2 | 2.3 | 2.1 | 2.0 |
|  | CaO | 8.8 | 9.0 | 9.0 | 9.0 | 9.1 | 9.1 |
|  | $Na_2O$ | 13.1 | 13.1 | 13.1 | 13.1 | 13.1 | 13.1 |
|  | $K_2O$ | 0.1 | 0.1 | 0.1 | 0.1 | 0.1 | 0.1 |
|  | $Fe_2O_3$ | 0.52 | 0.52 | 0.52 | 0.52 | 0.52 | 0.52 |
|  | Redox | 50 | 47 | 49 | 48 | 51 | 49 |
|  | $TiO_2$ | 0.35 | 0.34 | 0.34 | 0.34 | 0.34 | 0.34 |

TABLE 6-continued

|  | Ex. 28 | Ex. 29 | Ex. 30 | Ex. 31 | Ex. 32 | Ex. 33 |
|---|---|---|---|---|---|---|
| Tv (calculated as 4 mm thickness) [%] | 72.6 | 73.0 | 73.1 | 71.6 | 72.6 | 70.6 |
| Te (calculated as 4 mm thickness) [%] | 40.7 | 41.4 | 41.5 | 40.1 | 41.8 | 39.9 |
| Tuv (calculated as 4 mm thickness) [%] | 32.0 | 31.8 | 31.3 | 31.7 | 30.7 | 30.2 |
| Dw [nm] | 492 | 494 | 493 | 493 | 494 | 494 |
| $T_{1000\,nm}$ [%] | 10.8 | 11.7 | 11.9 | 10.8 | 12.6 | 11.2 |
| β-OH ($10^{-2}\cdot mm^{-1}$) | 27.5 | 25.1 | 26.4 | 25.3 | 26.5 | 24.9 |

TABLE 7

|  |  | Ex. 34 | Ex. 35 | Ex. 36 | Ex. 37 | Ex. 38 | Ex. 39 |
|---|---|---|---|---|---|---|---|
| Composition (%: mass percentage) | $SiO_2$ | 72.0 | 72.0 | 72.1 | 71.3 | 71.3 | 71.0 |
|  | $Al_2O_3$ | 2.9 | 2.9 | 2.8 | 1.0 | 1.0 | 1.0 |
|  | MgO | 2.0 | 2.0 | 2.1 | 4.5 | 4.5 | 4.4 |
|  | CaO | 9.1 | 9.1 | 9.1 | 8.8 | 8.8 | 8.7 |
|  | $Na_2O$ | 13.1 | 13.1 | 13.1 | 13.6 | 13.6 | 13.5 |
|  | $K_2O$ | 0.1 | 0.1 | 0.1 | 0.0 | 0.0 | 0.0 |
|  | $Fe_2O_3$ | 0.55 | 0.54 | 0.55 | 0.52 | 0.52 | 0.52 |
|  | Redox | 52 | 52 | 52 | 51 | 52 | 54 |
|  | $TiO_2$ | 0.25 | 0.34 | 0.25 | 0.34 | 0.34 | 0.34 |
| Tv (calculated as 4 mm thickness) [%] |  | 72.6 | 70.3 | 70.4 | 70.7 | 71.0 | 70.9 |
| Te (calculated as 4 mm thickness) [%] |  | 40.7 | 38.1 | 38.2 | 38.5 | 39.3 | 39.1 |
| Tuv (calculated as 4 mm thickness) [%] |  | 32.0 | 32.8 | 31.5 | 33.4 | 32.2 | 32.2 |
| Dw [nm] |  | 492 | 492 | 493 | 492 | 492 | 492 |
| $T_{1000\,nm}$ [%] |  | 10.8 | 8.6 | 8.9 | 8.9 | 9.9 | 9.0 |
| β-OH ($10^{-2}\cdot mm^{-1}$) |  | 23.5 | 27.6 | 25.6 | 24.5 | 25.4 | 26.4 |

Each of the heat-absorbing glass plates of the present invention in Examples 1 to 18 and 22 to 39 satisfied Te≦42% (calculated as 4 mm thickness) and Tv≧70% (calculated as 4 mm thickness), and the transmitted light through it was green.

The glass plate in Example 19 contained no $TiO_2$, and accordingly the transmitted light through it was blue (Dw of 488).

The glass plate in Example 20 had Redox less than 45%, and accordingly Te (calculated as 4 mm thickness) exceeded 42%.

The glass plate in Example 21 had a content of total iron as calculated as $Fe_2O_3$ less than 0.45% as represented by mass % based on oxides, and accordingly Te (calculated as 4 mm thickness) exceeded 42%.

Industrial Applicability

The heat-absorbing glass plate of the present invention is useful as a glass plate for vehicles and for building, and is particularly suitable as a glass plate for automobiles.

This application is a continuation of PCT Application No. PCT/JP2010/068744, filed on Oct. 22, 2010, which is based upon and claims the benefit of priority from Japanese Patent Application No. 2009-243284 filed on Oct. 22, 2009. The contents of those applications are incorporated herein by reference in its entirety.

What is claimed is:

1. A heat-absorbing glass plate which comprises soda lime silica glass containing coloring components, the coloring components containing, as represented by mass % based on the following oxides, from 0.45 to 0.61% of total iron as calculated as $Fe_2O_3$ and from 0.2 to 0.6% of $TiO_2$,
   which contains substantially no CoO, $Cr_2O_3$, $V_2O_5$, MnO nor $CeO_2$,
   which has a mass proportion of bivalent iron as calculated as $Fe_2O_3$ in total iron as calculated as $Fe_2O_3$ of from 45 to 60%,
   which has a solar transmittance of at most 42% calculated as 4 mm thickness as defined in JIS R3106 (1998),
   which has a visible light transmittance (by illuminant A) of at least 70% calculated as 4 mm thickness as defined in JIS R3106 (1998), and
   which provides a transmitted light having a dominant wavelength of from 492 to 500 nm as defined in JIS Z8701 (1982).

2. A heat-absorbing glass plate which comprises soda lime silica glass containing coloring components, the coloring components containing, as represented by mass % based on the following oxides, from 0.45 to 0.61% of total iron as calculated as $Fe_2O_3$ and from 0.2 to 0.6% of $TiO_2$,
   which contains substantially no cobalt oxide, chromium oxide, vanadium oxide, manganese oxide nor cerium oxide,
   which has a mass proportion of bivalent iron as calculated as $Fe_2O_3$ in total iron as calculated as $Fe_2O_3$ of from 45 to 60%,
   which has a solar transmittance of at most 42% calculated as 4 mm thickness as defined in JIS R3106 (1998),
   which has a visible light transmittance (by illuminant A) of at least 70% calculated as 4 mm thickness as defined in JIS R3106 (1998), and
   which provides a transmitted light having a dominant wavelength of from 492 to 500 nm as defined in JIS Z8701 (1982).

3. The heat-absorbing glass plate according to claim 1, which comprises soda lime silica glass having a composition substantially comprising, as represented by mass % based on the following oxides:

SiO$_2$: 65~75%,
Al$_2$O$_3$: 0.1~5%,
Na$_2$O+K$_2$O: 10~18%,
CaO: 5~15%,
MgO: 2~6%,
SnO$_2$: 0~0.5%,
SO$_3$: 0~1%,
total iron as calculated as Fe$_2$O$_3$: 0.45~0.61%,
TiO$_2$: 0.2~0.6%.

4. The heat-absorbing glass plate according to claim 1, wherein the content of total iron as calculated as Fe$_2$O$_3$ is from 0.49 to 0.54% as represented by mass % based on oxides.

5. The heat-absorbing glass plate according to claim 1, wherein the TiO$_2$ content is from 0.32 to 0.41% as represented by mass % based on oxides.

6. The heat-absorbing glass plate according to claim 1, wherein the mass proportion of bivalent iron as calculated as Fe$_2$O$_3$ in total iron as calculated as Fe$_2$O$_3$ is from 50 to 55%.

7. A process for producing a heat-absorbing glass plate, which comprises melting a glass raw material and forming the melt into a plate to produce soda lime silica glass containing coloring components, wherein
the coloring components of the glass after forming contain, as represented by mass % based on the following oxides, from 0.45 to 0.61% of total iron as calculated as Fe$_2$O$_3$ and from 0.2 to 0.6% of TiO$_2$,
the heat-absorbing glass plate contains substantially no CoO, Cr$_2$O$_3$, V$_2$O$_5$, MnO nor CeO$_2$, and
has a mass proportion of bivalent iron as calculated as Fe$_2$O$_3$ in total iron as calculated as Fe$_2$O$_3$ of from 45 to 60%, and
the glass plate after forming has a solar transmittance of at most 42% calculated as 4 mm thickness as defined in JIS R3106 (1998),
has a visible light transmittance (by illuminant A) of at least 70% calculated as 4 mm thickness as defined in JIS R3106 (1998), and
provides a transmitted light having a dominant wavelength of from 492 to 500 nm as defined in JIS Z8701 (1982).

8. A process for producing a heat-absorbing glass plate, which comprises melting a glass raw material and forming the melt into a plate to produce soda lime silica glass containing coloring components, wherein
the coloring components of the glass after forming contain, as represented by mass % based on the following oxides, from 0.45 to 0.61% of total iron as calculated as Fe$_2$O$_3$ and from 0.2 to 0.6% of TiO$_2$,
the heat-absorbing glass plate contains substantially no cobalt oxide, chromium oxide, vanadium oxide, manganese oxide nor cerium oxide, and
has a mass proportion of bivalent iron as calculated as Fe$_2$O$_3$ in total iron as calculated as Fe$_2$O$_3$ of from 45 to 60%, and
the glass plate after forming has a solar transmittance of at most 42% calculated as 4 mm thickness as defined in JIS R3106 (1998),
has a visible light transmittance (by illuminant A) of at least 70% calculated as 4 mm thickness as defined in JIS R3106 (1998), and
provides a transmitted light having a dominant wavelength of from 492 to 500 nm as defined in JIS Z8701 (1982).

* * * * *